J. W. CLICKSTINE.
FENDER.
APPLICATION FILED JUNE 17, 1914.
1,137,577.
Patented Apr. 27, 1915.
2 SHEETS—SHEET 1.
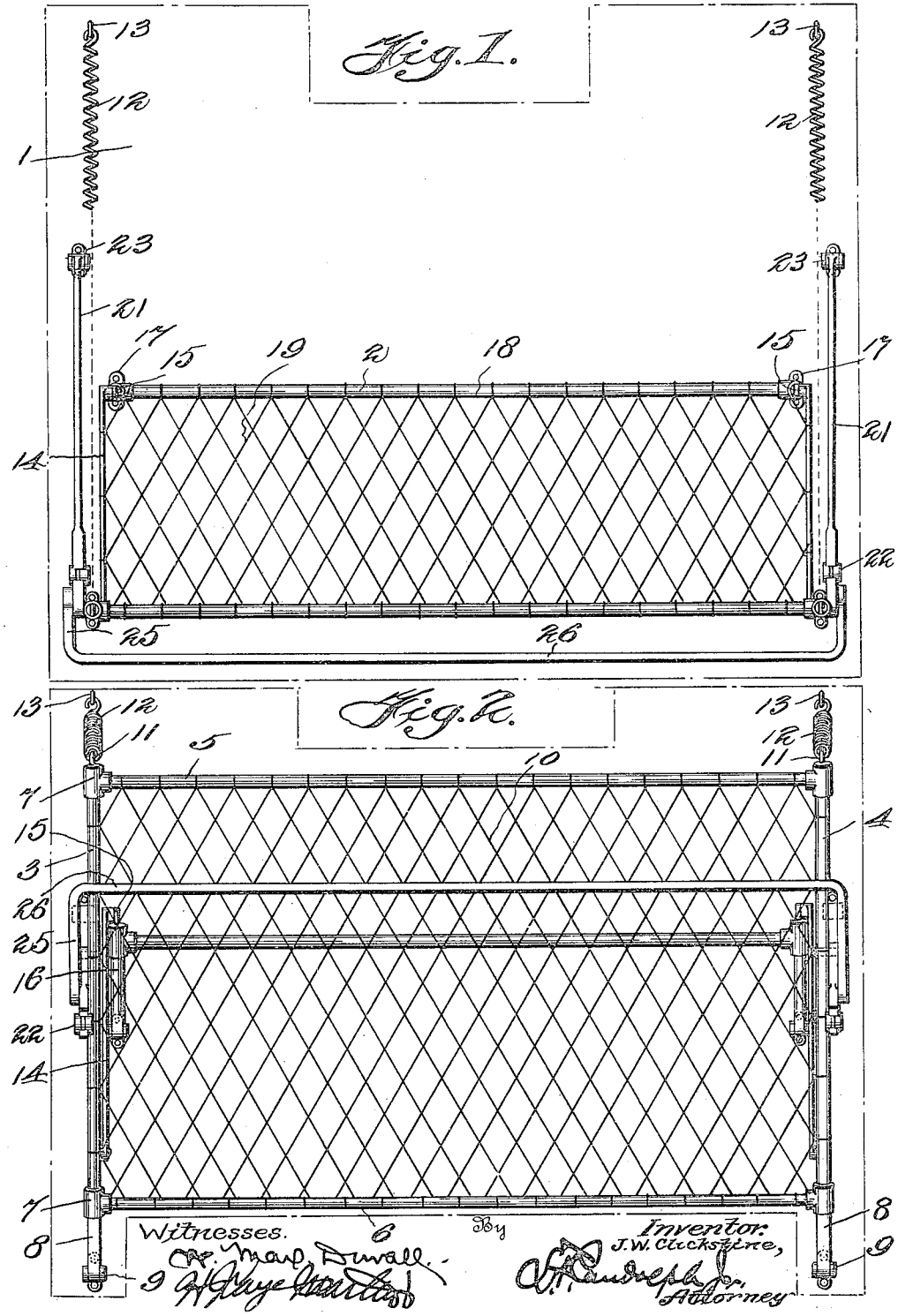

J. W. CLICKSTINE.
FENDER.
APPLICATION FILED JUNE 17, 1914.

1,137,577.

Patented Apr. 27, 1915.
2 SHEETS—SHEET 2.

Inventor
J. W. Clickstine,

Witnesses

By
Attorney

THE NORRIS PETERS CO., PHOTO-LITHO., WASHINGTON, D. C.

UNITED STATES PATENT OFFICE.

JAMES W. CLICKSTINE, OF CAMDEN, NEW JERSEY.

FENDER.

1,137,577.

Specification of Letters Patent.  Patented Apr. 27, 1915.

Application filed June 17, 1914.  Serial No. 845,645.

*To all whom it may concern:*

Be it known that I, JAMES WILLIAM CLICKSTINE, a citizen of the United States, residing at Camden, in the county of Camden and State of New Jersey, have invented certain new and useful Improvements in Fenders, of which the following is a specification.

This invention relates to new and useful improvements in car fenders and has for its principal object to provide a safety device which will prevent persons or objects from becoming injured when led into by a street car or similar vehicles.

Another object of the invention is to provide a fender which will automatically pick up the person or object struck and thereby eliminate any danger of said person or object becoming entangled in the wheels of the car.

A further object of the invention is to provide an automatic fender which is capable of being attached to a car of the ordinary construction which will effectively operate under the circumstances and conditions hereinbefore named.

Figure 3:
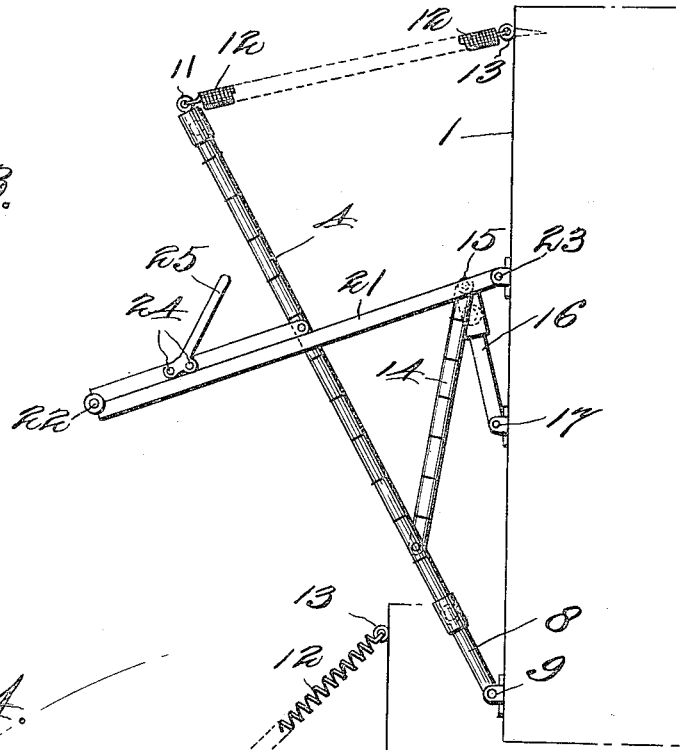
Figure 4:
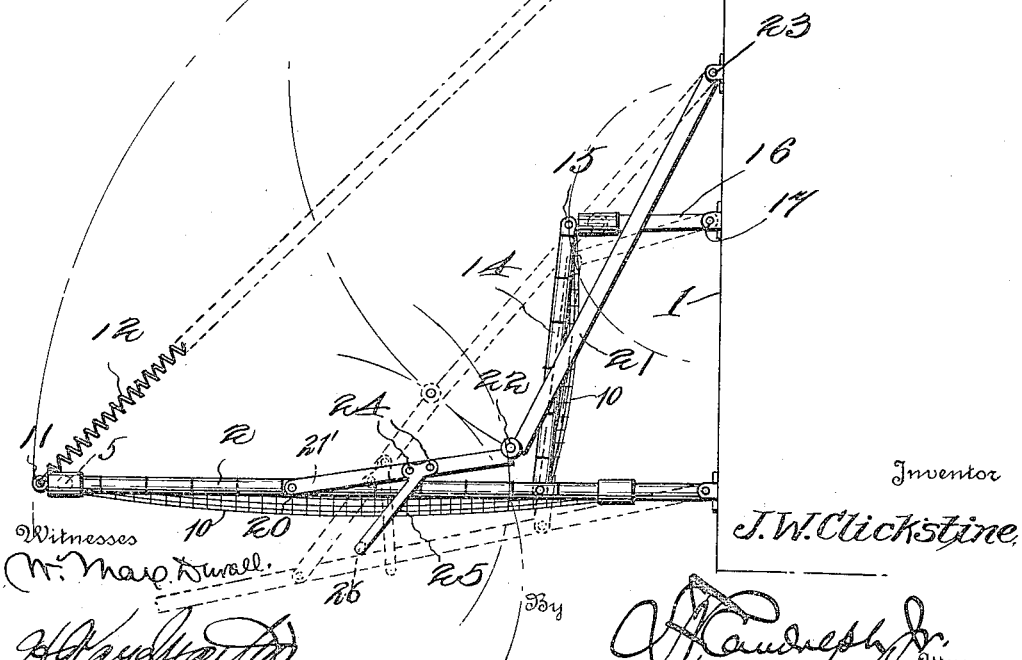

With these and other objects in view the invention consists in the novel combination and arrangement of parts which will be fully set forth in the following specification and accompanying drawings, in which, Figure 1 is a front view in elevation of a street car fender showing the device as it would appear in its normal raised position. Fig. 2 is a view similar to Fig. 1 showing the fender in a tripped position. Fig. 3 is an edge view of the fender showing the same in a tripped position, and Fig. 4 is a view similar to Fig. 3, showing the fender in a partially tripped position and illustrating in dotted lines the position of the same before being actuated and in its normal lowered position.

Referring now to the drawings by character of reference, the numeral 1 designates as an entirety the usual dash of the street car, while the numeral 2 designates as an entirety the fender frame. This fender comprising a rectangular frame formed of the side bars 3 and 4 and front and rear bars 5 and 6 respectively. These bars 5 and 6 are connected by means of the suitable connections 7 and the bars 3 and 4 are provided at their rear ends with the extensions 8. These extensions 8 are pivotally connected as at 9 to the dash board of the car and thus holds the frame of the fender in proper position. The fender frame is provided with the net 10 which is arranged to form a support for the person or object when falling on the fender. Connected to the free ends of the side bars 3 and 4 of the frame of the fender, as at 11, is a suitable coil spring 12, the opposite end of which is connected, as at 13, near the upper terminal of the dash of the car. This coil spring is preferably of a retractile type and is arranged to normally exert pull on the ends of the bars 3 and 4 to cause the fender to swing upwardly in the position illustrated in Figs. 2 and 3.

Secured to the side members 3 and 4 of the fender frame are pivotally secured the bars 14, the free ends of which are pivoted as at 15 to the pivoted arms 16, the opposite ends of which are pivoted as at 17 to the dash board 1 of the car. These pivotal arms 16 are connected near their free terminals by means of the transverse bar 18, while the extensions 19 of the net 10.

Pivotally connected near the forward ends of the frame of the fender, as at 20, are the brace rods which comprise the two sections 21' and 21 which are connected to each other by the elbow or rule joints 22. The upper ends of the section 21 are pivoted as at 23 to the dash board of the car, as clearly illustrated in Figs. 3 and 4.

Secured near the pivot point 20 of the brace rods, as at 24, are the angular projections 25, the lower ends of which terminate in the transversely extending tripping rod 26 as clearly shown in Figs. 1 and 2. This tripping rod 26 extends entirely across the fender and provides a means by which the fender is released and permitted to fold into the position shown in Fig. 3.

It will be understood that in the foregoing the fender is set by forcing the front bar 5 forwardly into the dotted line position as illustrated in Fig. 4. In this position it will be apparent that the tripping rod will lie immediately beneath the netting of the frame of the fender, and that the rod 21 will form a brace and prevent the person from falling under the influence of the spring 12. When a person or object is struck by the fender, the weight will fall on the tripping rod and thereby cause the same to be forced downwardly, which action will drive the knuckle joint 22 into the position shown in the full lines in Fig. 4 and thus permit the fender to be drawn upwardly, as shown in Fig. 3 under the influence of the springs 12, thereby raising the person or object upwardly from the track and preventing any danger of him or it becoming entagled in the running gear of the car.

While in the foregoing there has been shown and described the preferred embodiment of this invention, it is to be understood that such changes may be made in the combination and arrangement of parts as will fall within the spirit and scope of the invention as defined in the appended claims.

What is claimed is:—

1. A street car fender including a hinged frame secured to the dash of a street car, a spring connected to the free ends of the hinged frame and to the street car dash and arranged to exert upward pressure on the end of the frame, brace rods connected to the frame near its free ends, the opposite ends of the brace rods being connected to the street car dash, knuckle joints in the brace rods and means connected to the brace rods and extending beneath the frame whereby, when the fender strikes a person or object, the same will engage the tripping means and thereby cause the brace rods to bend on their knuckle joints and permit the spring to raise the forward end of the frame.

2. The combination with the dash of a street car of a fender frame pivotally secured to the dash, a jointed brace rod connected to the fender frame and to the dash and arranged to normally hold the fender frame downwardly, a spring connected to the fender frame and to the dash and arranged to normally exert upward pull on the fender frame and means carried by the jointed brace rod and extending beneath the fender frame to cause the brace rod to bend on its joint when the fender is engaged by a person or object.

3. The combination with a dash of a street car of a fender frame suitably connected thereto, springs connected to the free ends of the fender frame and exerting upward pull thereon, brace rods connected near the free ends of the frame, said brace rods being provided with knuckle joints and also being connected to the dash to normally hold the fender in its lower position and a U-shaped bar connected with the brace rods and extending beneath the fender frame to form a tripping means therefor.

In testimony whereof I affix my signature in presence of two witnesses.

JAMES W. CLICKSTINE.

Witnesses:
LAWRENCE M. VERGA,
EMILY W. MCGILL.